M. F. WILLIAMS.

DISINTEGRATOR OR CRUSHER.

No. 11,634. Reissued Oct. 26, 1897.

Witnesses:

A. B. Lail

R. M. Clifton

Inventor,

Milton F. Williams

By H. M. Plaisted his Atty.

UNITED STATES PATENT OFFICE.

MILTON F. WILLIAMS, OF ST. LOUIS, MISSOURI, ASSIGNOR TO THE WILLIAMS PATENT CRUSHER AND PULVERIZER COMPANY, OF SAME PLACE.

DISINTEGRATOR OR CRUSHER.

SPECIFICATION forming part of Reissued Letters Patent No. 11,634, dated October 26, 1897.

Original No. 544,336, dated August 13, 1895. Application for reissue filed March 27, 1897. Serial No. 629,626.

*To all whom it may concern:*

Be it known that I, MILTON F. WILLIAMS, of the city of St. Louis, State of Missouri, have invented certain new and useful Improvements in Disintegrators or Crushers, of which the following is a full, clear, and exact description, reference being had to the accompanying drawings, forming a part hereof.

My invention relates to an improved disintegrator or crusher; and it consists in the novel construction, combination, and arrangement of parts hereinafter described and claimed.

Figure 1:
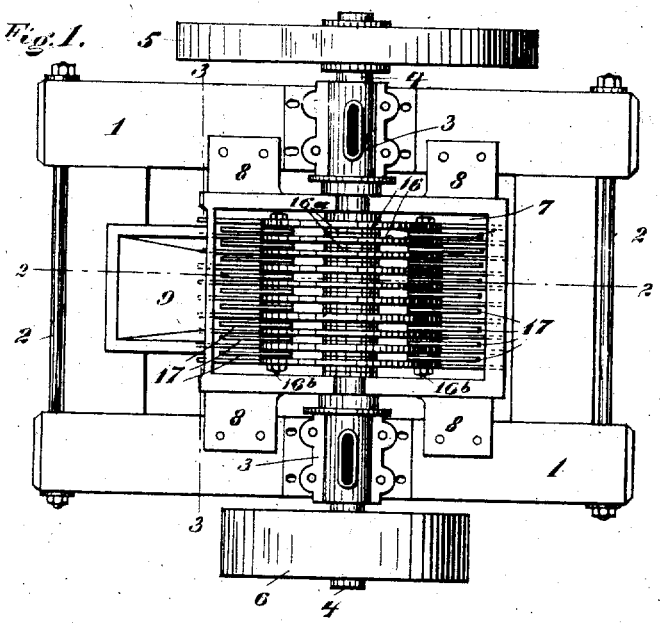
Figure 2:
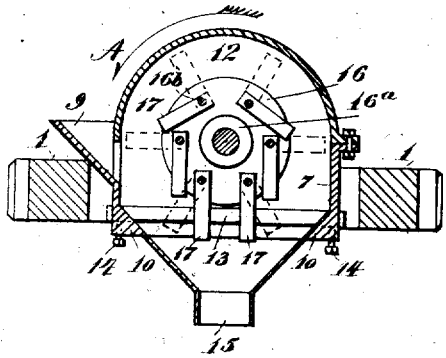
Figure 3:
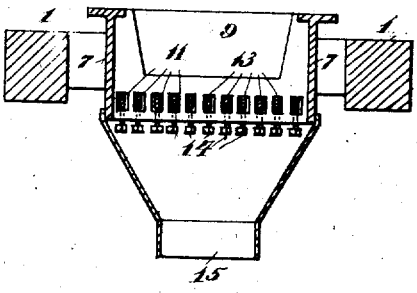

In the drawings, Figure 1 is a top plan view of my improved disintegrator or crusher. Fig. 2 is a cross-sectional view taken approximately on the indicated line 2 2 of Fig. 1. Fig. 3 is a transverse sectional view taken approximately on the indicated line 3 3 of Fig. 1.

Referring by numerals to the accompanying drawings, 1 indicates a suitable rectangular framework that is held together at the ends by suitable tie-rods 2. Located upon the top surfaces of the two side rails of this framework 1 and in alinement with each other are journal-bearings 3. Mounted for rotation in these journal-bearings 3 is a shaft 4, the ends of which project slightly beyond said journal-bearings. On one end of said shaft is located a fly-wheel 5 and upon the opposite end of said shaft is located a belt wheel or pulley 6.

Located within the frame 1, beneath the shaft 4, is a rectangular metallic box 7, the same being provided with laterally-projecting perforated ears 8, that are bolted to the side rails of the frame 1, thereby rigidly securing in proper position said metallic box 7. This box 7 is provided on its front end with an integral hopper 9, and the lower edges of the walls of this box 7 are provided with an inwardly-projecting flange or lip, as indicated by the numeral 10, and in said walls closely adjacent said lower edges are formed a series of rectangular slots or openings 11, the row of slots or openings 11 on one side of the box being in alinement with the row on the other side of said box.

12 indicates a semicircular cover that is bolted or removably fixed in any suitable manner to the top of the metallic box 7. Extending transversely across the bottom of the box 7 is a series of metallic bars or slats 13, the ends of which rest in the alined slots or openings 11, and said bars or slats 13 are rigidly held in said slots or openings and across the discharge-opening in proper position by means of headed screw-bolts 14, that pass upwardly through the flange or lip 10, formed integral with the lower edges of the box 7. Fixed to said box in any suitable manner and depending therefrom is a discharge-spout 15.

Rigidly mounted upon the shaft 4, within the box 7, are a series of disks 16, the peripheries of which travel in a path just above the horizontal plane occupied by the top edges of the bars 13. These disks are held at equal distances apart by interposing equalized washers or rings $16^a$ between said disks and upon the shaft 4. Loosely pivoted upon bolts $16^b$, that pass longitudinally through the entire series of disks 16, are a series of short metallic bars 17, the same performing the function of hammers, and said metallic bars 17 while in movement pass between the transversely-positioned bars or slats 13.

The operation is as follows: A belt is passed over the pulley 6, and said pulley is rotated at a very high rate of speed in the direction of the arrow A, Fig. 2. Consequently the shaft 4, upon which said pulley is rigidly fixed, and the disks 16, which are mounted upon said shaft 4, will be rotated at a rate of speed equal to the speed of the driven pulley 6. According to the well-known laws of centrifugal action the bars 17 will, as soon as the disks to and between which they are pivoted attain a certain speed, be carried or thrown outwardly and into lines radiating from the center of the shaft 4. The rock, coal, clay, or other product to be crushed or disintegrated is fed in through the hopper 9 to the interior of the metallic box 7. As soon as it enters said box it will be forcibly struck successively by the rapidly-moving bars 17 and disintegrated or crushed in the desired manner. The bars below in turn back up the material as it is further reduced till it is fine enough to pass between the bars. The material is thus held by the bars under the shower of blows till crushed and passed through. Some of the said product will be carried around on the inner side of the semicircular top 12 of the casing and fall or gravitate onto the bars or slats 13, and said product will be further crushed or disintegrated until it is fine enough to pass through between said bars or slats. If the product on being first fed through the chute or hopper 9 resists the blows of the rapidly-moving bars 17, said bars will move inwardly toward the shaft 4 and pass by said product. Thus the pivoted bars 17 are made to perform the function of hammers in disintegrating or crushing the product, as said bars when moving at a very high rate of speed strike a blow in every way similar to a blow of the hammer. The positions occupied by these bars 17 when the shaft 4 is at rest are clearly indicated by solid lines in Fig. 2, while the positions they occupy when the disk is highly rotated and said bars are thrown outwardly by centrifugal action are clearly shown by dotted lines in Fig. 2.

Assuming that the shaft 4 is rotated at a speed approximating three hundred revolutions per minute, if there be six bars such as 17 mounted upon each one of the disks, there will necessarily be approximately eighteen hundred blows struck per minute by the bars carried by each disk, and this action will not fail to crush or disintegrate in the manner desired any product that may be passed through a machine of the class described.

A disintegrator or crusher of the class described is especially adapted for use in disintegrating coal, clay, shale, &c., though it may be advantageously used for crushing or disintegrating ore-bearing rock, &c.

By constructing the slots or apertures 11 slightly wider than the bars 13 the degree of fineness to which the product may be crushed or disintegrated may be regulated by setting the bars nearer together in the wide slots. The washers 16[a] will vary the spaces of the hammer-bearing disks according to the bars or other requirements.

What I claim is—

1. The improved disintegrator or crusher, comprising a suitable frame, a plurality of annular series of rotary hammers supported by said frame and each series spaced a distance apart, a rectangular metallic box 7 supported by said frame and having at its lower edges an inwardly-projecting flange or lip 10, the opposite walls of said box at points adjacent said lower edges having formed in them a series of rectangular slots 11, a suitable cover and hopper for said box, a series of metallic bars or slats 13 extending across said box and having their ends loosely mounted in said slots, and screw-bolts 14 passed upwardly through said flange or lip into engagement with said bars or slats, substantially as specified.

2. In a crusher, the combination with a casing having a discharge-opening and slots adjacent thereto, of a set of bars mounted in said slots and laterally adjustable therein across said discharge-opening, means to fasten said bars in their adjusted position, and rotary hammers mounted in said casing adapted to coact with said bars in crushing the material delivered to the casing.

In testimony whereof I affix my signature in the presence of two witnesses.

MILTON F. WILLIAMS.

Witnesses:

M. JUDSON WILLIAMS,
GEORGE RICHARDS.